United States Patent
Thirumalai

(10) Patent No.: US 10,602,147 B2
(45) Date of Patent: Mar. 24, 2020

(54) EFFICIENT ENTROPY CODING GROUP GROUPING METHODOLOGY FOR TRANSFORM MODE

(71) Applicant: Samsung Display Co., Ltd., Yongin, Gyeonggi-Do (KR)

(72) Inventor: Vijayaraghavan Thirumalai, Fremont, CA (US)

(73) Assignee: SAMSUNG DISPLAY CO., LTD. (KR)

(*) Notice: Subject to any disclaimer, the term of this patent is extended or adjusted under 35 U.S.C. 154(b) by 39 days.

(21) Appl. No.: 16/121,444

(22) Filed: Sep. 4, 2018

(65) Prior Publication Data

US 2020/0021809 A1 Jan. 16, 2020

Related U.S. Application Data

(60) Provisional application No. 62/696,266, filed on Jul. 10, 2018.

(51) Int. Cl.
*H04N 11/02* (2006.01)
*H04N 19/13* (2014.01)
(Continued)

(52) U.S. Cl.
CPC .......... *H04N 19/13* (2014.11); *H04N 19/103* (2014.11); *H04N 19/147* (2014.11);
(Continued)

(58) Field of Classification Search
CPC ...................................................... H04N 19/13
(Continued)

(56) References Cited

U.S. PATENT DOCUMENTS 6,278,735 B1* 8/2001 Mohsenian .......... H04N 19/176
375/240
6,577,681 B1* 6/2003 Kimura ................ H04N 19/176
375/240.03

(Continued)

OTHER PUBLICATIONS

Natan Jacobson, "A new display stream compression standard under development in VESA", Proc. SPIE 10396, Applications of Digital Image Processing XL, 103960U (Sep. 19, 2017); doi: 10.1117/12.2274595.

(Continued)

*Primary Examiner* — Leron Beck
(74) *Attorney, Agent, or Firm* — Innovation Counsel LLP

(57) ABSTRACT

A system and method of forming entropy coding groups in an entropy encoder operating in a transform mode includes receiving a block of a first number of quantized transform coefficients as a current block of sample values and evaluating the current block of sample values using one or more grouping factors. In response to a determination that the current block meets a first grouping condition, a first grouping method is selected where the first grouping method forms a first entropy coding group with one sample value of a DC transform coefficient. In response to a determination that the current block meets a second grouping condition, a second grouping method is selected where the second grouping method forms a first entropy coding group with at least two sample values, one of the sample values being the DC transform coefficient.

20 Claims, 13 Drawing Sheets

(51) Int. Cl.
*H04N 19/18* (2014.01)
*H04N 19/176* (2014.01)
*H04N 19/103* (2014.01)
*H04N 19/147* (2014.01)
*H04N 19/436* (2014.01)
*H04N 19/11* (2014.01)

(52) U.S. Cl.
CPC ........... *H04N 19/176* (2014.11); *H04N 19/18* (2014.11); *H04N 19/11* (2014.11); *H04N 19/436* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 8,625,681 B2* | 1/2014 | Xu | ............ | H04N 19/147 375/240.27 |
| 9,350,988 B1* | 5/2016 | Bankoski | ............ | H04N 19/103 |
| 10,382,784 B2* | 8/2019 | Henry | ............ | H04N 19/25 |
| 2004/0240556 A1* | 12/2004 | Winger | ............ | H04N 19/176 375/240.18 |
| 2009/0304292 A1* | 12/2009 | Chen | ............ | H04N 19/176 382/233 |
| 2010/0046628 A1* | 2/2010 | Bhaskaran | ............ | H04N 19/103 375/240.24 |
| 2011/0091121 A1* | 4/2011 | Fukuhara | ............ | H04N 19/647 382/234 |
| 2012/0014433 A1* | 1/2012 | Karczewicz | ............ | H03M 7/40 375/240.02 |
| 2014/0294315 A1 | 10/2014 | Yang et al. | | |
| 2015/0319441 A1* | 11/2015 | Puri | ............ | H04N 19/61 375/240.02 |
| 2017/0085886 A1* | 3/2017 | Jacobson | ............ | H04N 19/156 |
| 2017/0118473 A1* | 4/2017 | Thirumalai | ............ | H04N 19/46 |

OTHER PUBLICATIONS

Nimrod Peleg, Basics of dct and entropy coding, Apr. 30, 2009, available at https://www.math.cuhk.edu.hk/~lmlui/J4DCT-Huff2009.pdf.

* cited by examiner

FIG. 6(a) Entropy Coding Group: Prefix | Suffix 1 | Suffix 2 | Suffix 3 | Suffix 4

FIG. 6(b) Samples {1, -2, -1, 0}, Two's complement: 110 | 01 | 10 | 11 | 00; Unary Code of 2

FIG. 6(c) Group 1: Prefix | Suffix 1 | Suffix 2 | Suffix 3 | Suffix 4; Group 2: Prefix | Suffix 1 | Suffix 2 | Suffix 3 | Suffix 4

FIG. 6(d) Samples {1, -2, -1, 0}, sign-magnitude: 110 | 01 | 10 | 00 | 1 | 0 | 0; Unary Code of 2

FIG. 6

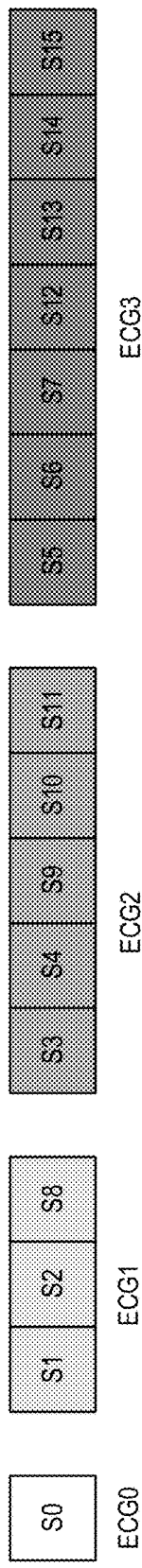

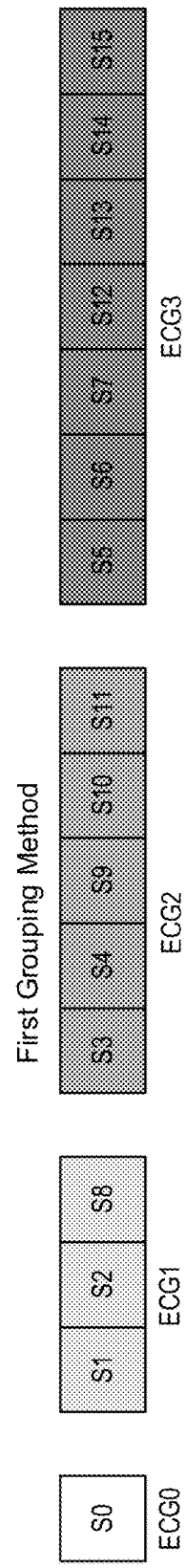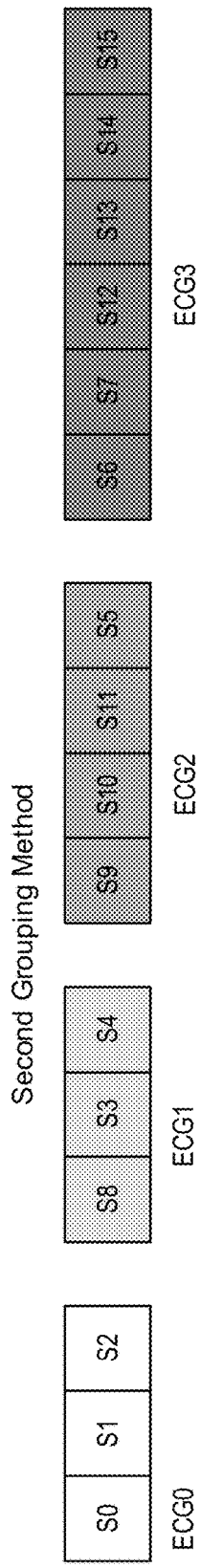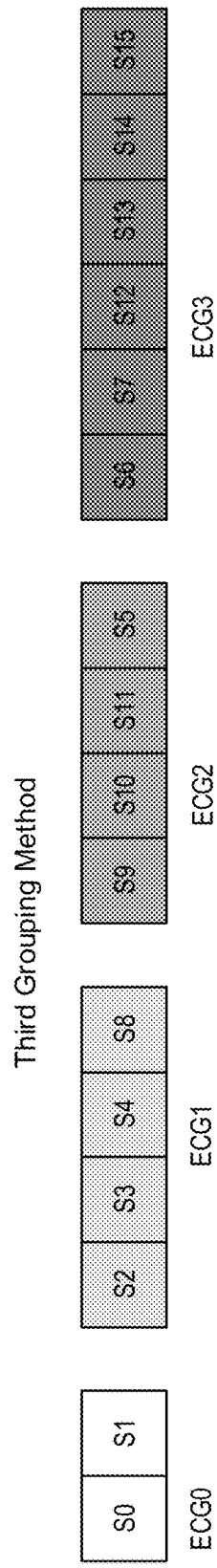
FIG. 9

FIG. 10(a)

Sample Block (4:2:2)

| S0 | S1 | S2 | S3 |
|----|----|----|----|
| S4 | S5 | S6 | S7 |

FIG. 10(b)

ECG0: S0

ECG1: S1 | S2 | S3 | S4 | S5 | S6 | S7

First Grouping Method

FIG. 10(c)

ECG0: S0 | S1 | S2

ECG1: S3 | S4 | S5 | S6 | S7

Second Grouping Method

FIG. 10

EFFICIENT ENTROPY CODING GROUP GROUPING METHODOLOGY FOR TRANSFORM MODE

CROSS REFERENCE TO RELATED APPLICATIONS

This application claims priority to U.S. Provisional Patent Application No. 62/696,266, entitled EFFICIENT ENTROPY CODING GROUP GROUPING METHODOLOGY FOR TRANSFORM MODE, filed Jul. 10, 2018, which is incorporated herein by reference for all purposes.

FIELD OF THE DISCLOSURE

The present disclosure relates to a method for entropy coding using transform mode and, in particular, to an entropy coding group grouping method for transform mode in a high-throughput entropy coder.

BACKGROUND OF THE DISCLOSURE

VESA (Video Electronics Standard Association) developed a new display interface compression standard for mobile or smartphone displays or hand-held devices called VESA Display Compression-Mobile or VDC-M. VDC-M targets higher compression ratio than Display Stream Compression (DSC) while maintaining visually lossless quality as of DSC at the cost of increased complexity. VDC-M has application in mobile devices that use a display link, such as the MIPI display serial interface (DSI). The VDC-M display interface compression standard is described in Jacobson et al., "A new display stream compression standard under development in VESA", Proc. SPIE 10396, Applications of Digital Image Processing XL, 103960U (19 Sep. 2017).

In particular, the VDC-M compression standard is fixed rate codec (encoder-decoder) and supports compression rates down to 6 bits/pixel for a RGB 4:4:4 signal source with 8 bits per color component. VDC-M is a block based codec with a block size of 8×2 pixels. In operation, the VDC-M codec operates by applying or testing multiple coding modes for each block and selecting a best coding mode for a block based on a rate-distortion cost. A different coding mode may be selected for each block. With the selected coding mode, the data samples are encoded using an entropy encoder to generate a compressed bitstream. Substream multiplexing is implemented to enable parallel parsing of the compressed bitstream to achieve a high decoder throughput.

SUMMARY OF THE DISCLOSURE

The present disclosure discloses a device and method for forming entropy coding groups substantially as shown in and/or described below, for example in connection with at least one of the figures, as set forth more completely in the claims.

These and other advantages, aspects and novel features of the present disclosure, as well as details of an illustrated embodiment thereof, will be more fully understood from the following description and drawings.

In one embodiment, a method of forming entropy coding groups in an entropy encoder operating in a transform mode includes receiving a block of a first number of quantized transform coefficients generated by the transform mode processing as a current block of sample values; evaluating the current block of sample values using one or more grouping factors; in response to a determination that the current block meets a first grouping condition based on at least one grouping factor, selecting a first grouping method for the current block, the first grouping method forming a second number of entropy coding groups where a first entropy coding group includes one sample value being a DC transform coefficient; in response to a determination that the current block meets a second grouping condition based on at least one grouping factor, selecting a second grouping method for the current block, the second grouping method forming the second number of entropy coding groups where a first entropy coding group includes at least two sample values, one of the sample values being the DC transform coefficient; forming the second number of entropy coding groups using the selected grouping method; converting the sample values in each entropy coding group to a bit-based representation; and providing the bit-representation of the second number of entropy coding groups as an output.

In another embodiment, a system for forming entropy coding groups in an entropy encoder operating in a transform mode includes a processor; and a memory coupled with the processor, wherein the memory is configured to provide the processor with instructions which when executed cause the processor to: receive a block of a first number of quantized transform coefficients generated by the transform mode processing as a current block of sample values; evaluate the current block of sample values using one or more grouping factors; in response to a determination that the current block meets a first grouping condition based on at least one grouping factor, select a first grouping method for the current block, the first grouping method forming a second number of entropy coding groups where a first entropy coding group includes one sample value being a DC transform coefficient; in response to a determination that the current block meets a second grouping condition based on at least one grouping factor, select a second grouping method for the current block, the second grouping method forming the second number of entropy coding groups where a first entropy coding group includes at least two sample values, one of the sample values being the DC transform coefficient; form the second number of entropy coding groups using the selected grouping method; convert the sample values in each entropy coding group to a bit-based representation; and provide the bit-representation of the second number of entropy coding groups as an output.

In another embodiment, a method of decoding a compress bit stream includes receiving a compressed bitstream that has been encoded using an encoding method in an entropy encoder utilizing multiple grouping methods in transform mode operation; processing a current block of samples values in the received compressed bitstream; evaluating the current block of sample values using one or more grouping factors; determining a grouping method from the multiple grouping methods used to encode the current block, the multiple grouping methods including a first grouping method forming a second number of entropy coding groups where a first entropy coding group includes one sample value comprising a DC transform coefficient and a second grouping method forming the second number of entropy coding groups where a first entropy coding group includes at least two sample values, one of the sample values comprising the DC transform coefficient; in response to the determining, decoding the current block using the determined grouping method; and generating quantized transform coefficients for each component as an output.

BRIEF DESCRIPTION OF THE DRAWINGS

Various embodiments of the disclosure are disclosed in the following detailed description and the accompanying drawings.

FIG. 6, which includes FIGS. 6(a) to 6(d), illustrates entropy coding group structure and the output of the common prefix entropy code (CPEC) in some examples.

FIG. 7, which includes FIGS. 7(a) and 7(b), illustrates the conventional grouping method used to form entropy coding groups for one component in a block of sample values coded by the transform mode.

FIG. 8, which includes FIGS. 8(a) and 8(b), illustrates the conventional grouping method used to form entropy coding groups for one component in a block of 8 sample values coded by the transform mode.

FIG. 9, which includes FIGS. 9(a) to 9(d), illustrates three grouping methods which can be applied to form entropy coding groups for the transform mode in some embodiments.

FIG. 10, which includes FIGS. 10(a) to 10(c), illustrates two grouping methods which can be applied to form entropy coding groups for the chroma components of the transform mode for 4:2:2 video content in some embodiment.

DETAILED DESCRIPTION

According to embodiments of the present disclosure, a display interface codec performs video signal compression using a transform coding mode to encode a block of pixel values and implementing entropy coding by applying two or more grouping methods to form the entropy coding groups (ECG) for each component in a block of quantized transform coefficients generated from the corresponding component in the block of pixel values. In some embodiments, the display interface codec includes a display stream encoder that implements multiple grouping methods to form entropy coding groups (ECG) for each component in a block of quantized transform coefficients. In some embodiments, the grouping methods include a first grouping method forming a first entropy coding group with DC coefficient only and a second grouping method forming a first entropy coding group with DC coefficients and some AC coefficients. The entropy coder in the display stream encoder applies one or more factors to select the grouping method to use for each block so that the sample values within an entropy coding group thus formed will have sample values within a similar range. In this manner, the decoder operation is made more efficient and high decoder throughput can be realized.

In embodiments of the present disclosure, the display interface codec includes a display stream decoder which implements the encoder entropy coding group grouping methodology to decode the compressed bitstream. In particular, the display stream decoder receives a compressed bitstream generated using multiple grouping methods at the encoder. The decoder applies the one or more factors used to select the grouping method at the encoder to determine the grouping method being used for each block in the compressed bitstream. The decoder then decodes each block based on the grouping method used by the encoder.

Figure 1:
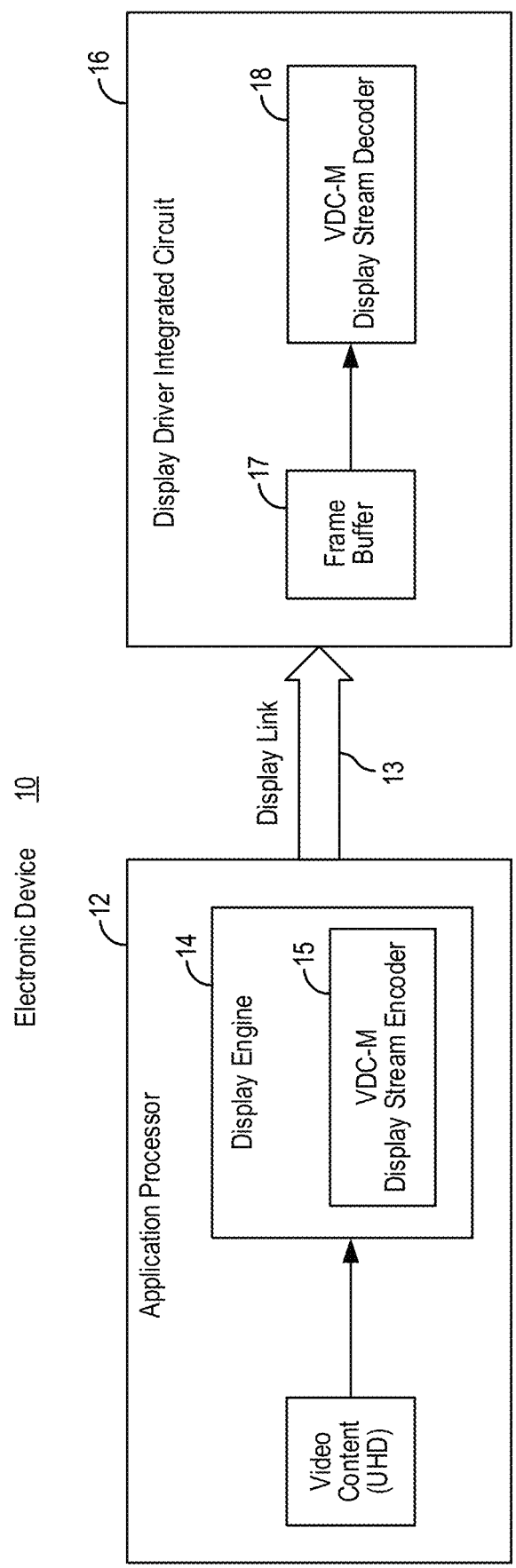
FIG. 1 is a schematic diagram illustrating a system configuration for implementing the display interface codec in some examples.

In embodiments of the present disclosure, the display interface codec performs video signal compression based on the display interface compression standard for mobile or smartphone displays called VESA Display Compression Mobile (or VDC-M). VDC-M is fixed rate codec (encoder-decoder) and supports compression rates down to 6 bits/pixel for a RGB 4:4:4 source. FIG. 1 is a schematic diagram illustrating a system configuration for implementing the display interface codec in some examples. Referring to FIG. 1, an electronic device 10 includes an application processor 12 communicating with a display driver integrated circuit 16 over a display link 13. The application processor 12 includes a display engine 14 which receives video content and implements a display stream encoder 15, such as a display stream encoder based on VDC-M display interface compression standard. The encoded bitstream is transmitted from the encoder 15 over the display link 13 to the display driver integrated circuit 16. The display link 13 may be a physical link or a wireless link. The display driver integrated circuit 16 includes a frame buffer 17 for storing the incoming bitstream and providing the received bitstream to a display stream decoder 18, such as a display stream decoder based on VDC-M display interface compression standard.

In some embodiments, the display stream encoder and the display stream decoder are both implemented as hardware components, such as semiconductor integrated circuits. In some embodiments, the display stream encoder and the display stream decoder are implemented as application specific integrated circuits (ASICs). In other embodiments, the display stream decoder is implemented in hardware while the display stream encoder is implemented in software or firmware in the application processor on the host system.

Figure 2:
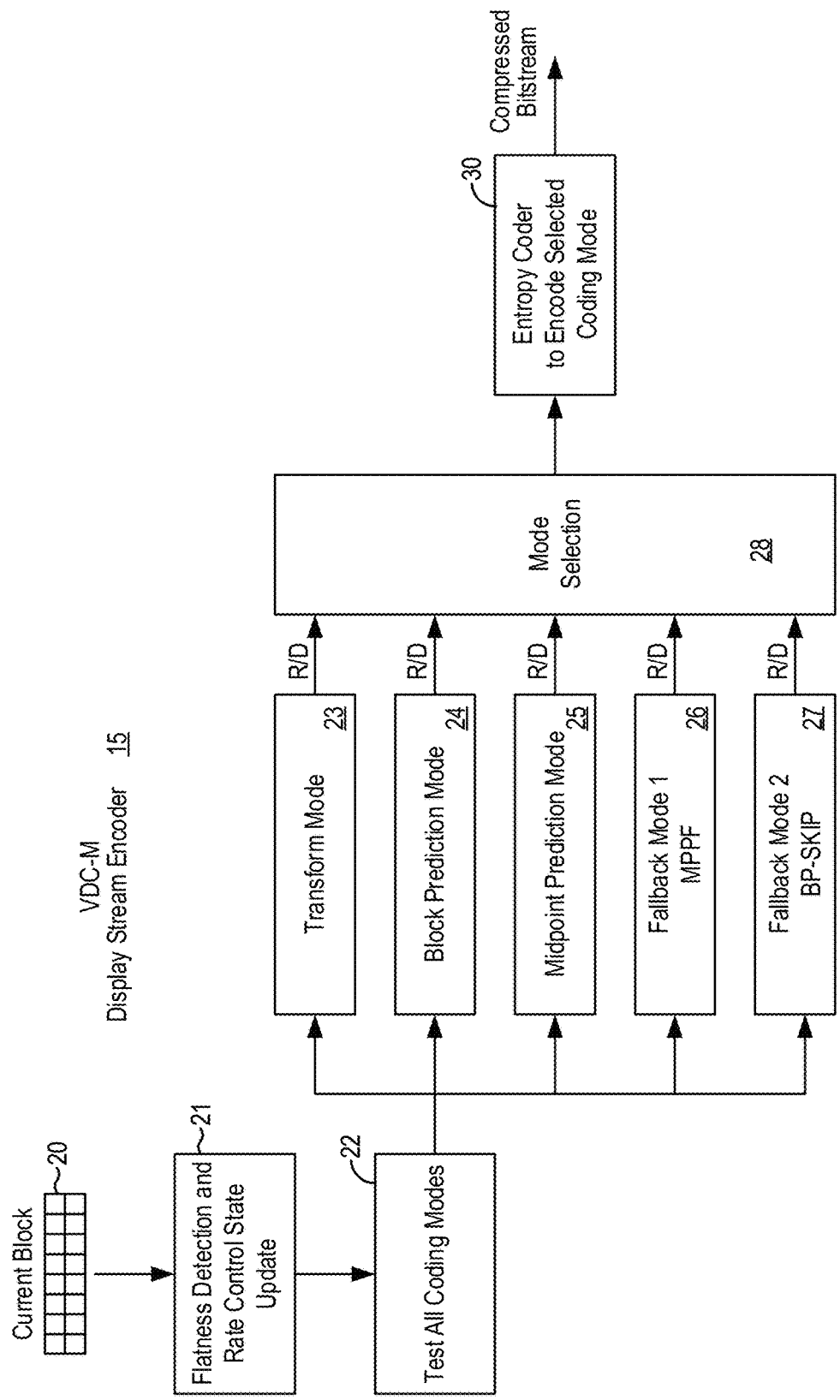
FIG. 2 is a process diagram illustrating the operation of the display stream encoder in some examples.

FIG. 2 is a process diagram illustrating the operation of the display stream encoder in some examples. The VDC-M display interface compression standard is a block based codec with a block size of 8×2 pixels. Accordingly, the display stream encoder 15 operates on the video data in blocks of 8×2 pixels, for example, in 8 columns and 2 rows. Referring to FIG. 2, the display stream encoder 15 receives pixel values for a current block of 8×2 pixels (20). Each block of pixels includes pixel values for one or more color components. For example, each block of pixels typically includes pixel values for three color components. The encoder 15 performs flatness detection and updates the rate control state update (21). The encoder 15 then tests the full set of coding modes in parallel on the pixel values for the current block of pixels (22). In the present example, the coding modes 23-27 are applied. For each coding mode, the encoder 15 determines a rate R of the mode, being the total of all syntax bits required by the mode, and a distortion D. The encoder 15 determines the RD cost for each coding mode. The encoder 15 selects the coding mode with the smallest RD cost (28) subject to rate control constraints. The encoder 15 then encodes the selected coding mode using an entropy coder (30). The entropy encoder generates a compressed bitstream which can be transmitted onto the display link. The display stream encoder 15 then move onto the next block of pixels. In operation, a different coding mode may be selected for each block of pixels in a frame of video content.

In the present description, "component" or "color components" refers to the color component used to represent the video signal, which can be RGB or YCbCr or YUV.

Each coding mode in the display stream encoder 15 has properties which are tailored to specific type of video content. In the present example, the display stream encoder 15 implements the following coding modes:

(1) Transform mode (23)—the transform mode is useful for capturing natural contents in the input video source. An example of the transform mode is the discrete cosine transform.

(2) Block prediction (BP) mode (24)—the block prediction mode is useful for capturing graphic and textured contents in the input video source.

(3) Midpoint prediction (MPP) mode (25)—the midpoint prediction mode is useful in capturing uncorrelated noise contents in the input video source.

(4) Fallback Modes (26, 27)—one or more fallback modes are provided to guarantee fixed-rate compression when other modes are not affordable. In the present example, a midpoint prediction fallback (MPPF) mode (26) and a block prediction skip (BP-Skip) mode (27) are provided.

Transform Mode

Figure 3:
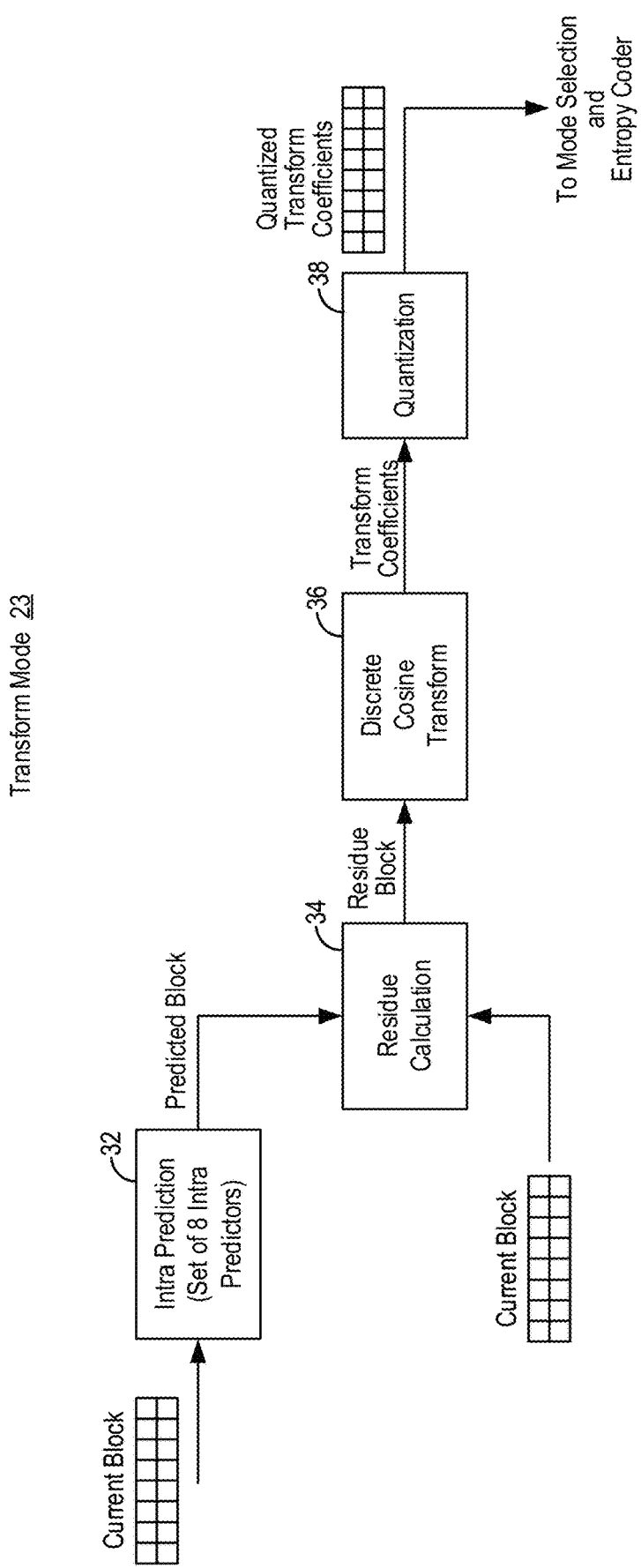
FIG. 3 is a process diagram illustrating the transform mode operation in the display stream encoder in some examples.

The transform coding mode in the display stream encoder will now the described in more detail. FIG. 3 is a process diagram illustrating the transform mode operation in the display stream encoder in some examples. The transform mode applies intra prediction to the current block of pixel values to generate a predicted block of pixel values (32). In particular, in the transform coding mode, the encoder tests a set of intra predictors for the current block to determine which intra predictor produces the smallest RD cost. From the set of intra predictors, a best intra predictor is selected. With the intra predictor selected, the encoder in transform mode generates a residue block being the difference between the pixel values of the current block and the pixel values of the predicted block generated by the selected intra predictor (34). The encoder than applies a discrete cosine transform (DCT) to the pixel values of the residual block to generate a block of transform coefficients (36). The block of transform coefficients are quantized to produce a block of quantized transform coefficients (38). When the transform mode is the selected coding mode by the encoder, the quantized transform coefficients are then encoded by the entropy coder and transmitted onto the display link.

Figure 4:
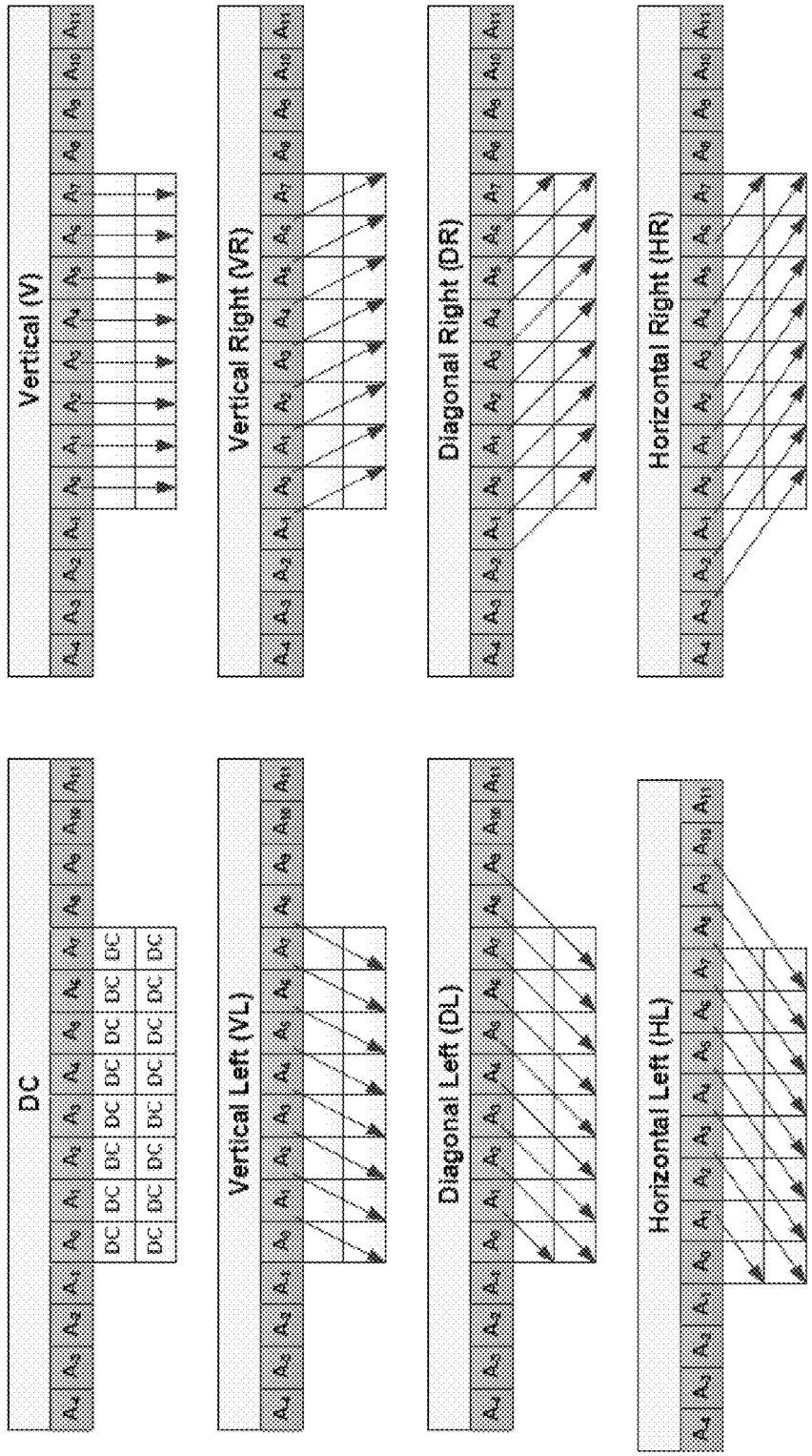
FIG. 4 illustrates the set of eight intra predictors which can be used in the transform coding mode in some examples.

FIG. 4 illustrates the set of eight intra predictors which can be used in the transform coding mode in some examples. Referring to FIG. 4, a set of eight intra predictors which can be applied in the transform coding mode for performing intra prediction includes DC, Vertical, Vertical Left, Vertical Right, Diagonal Left, Diagonal Right, Horizontal Left, and Horizontal Right. In the present example, the intra predictors similar to the ones used in H.264 video coder are used with modifications. In particular, the modification may include not using the samples in the immediate left blocks in order to allow for low complexity and low latency.

For each block of pixels, each intra predictor generates a block of predicted pixel values using the pixel values from the previous line, denoted as pixels $A_{-4}$ to $A_{11}$ in FIG. 4. In case of current block is in the first line in the frame or in the slice, the current block has no neighbors available. In that case, the DC predictor is used. That is, a DC value equal to half the dynamic range of the source data is used as the predicted pixel value for the current block. For example, the DC value of 128 will be used for 8 bits per channel (bpc) video source. For blocks that are not in the first line, other intra predictors, such as Vertical or Vertical Left, can be used where the pixel values in the previous line are used to predict the pixel values in the current block.

Entropy Coder

Figure 5:
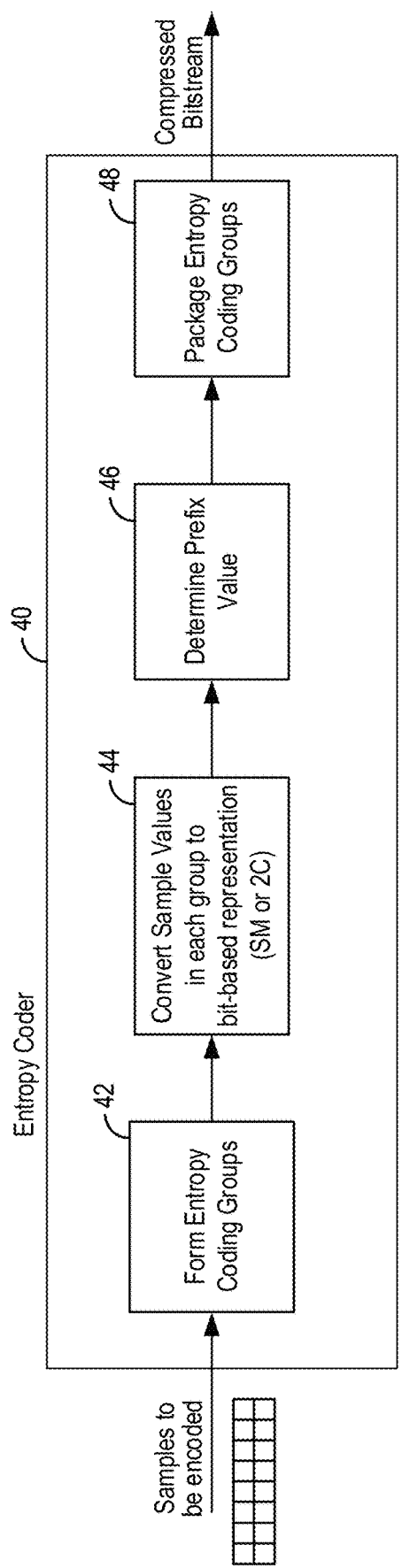
FIG. 5 is a process diagram illustrating the operation of an entropy coder in some examples.

Returning to FIG. 2, with the coding mode selected, the display stream encoder 15 encodes the samples using the entropy coder (30). The operation of the entropy coder will now be described. FIG. 5 is a process diagram illustrating the operation of an entropy coder in some examples. The entropy coder is designed to facilitate high-throughput at the decoder by dividing the samples in each color component of a block into separate groups. Referring to FIG. 5, the entropy coder 40 receives the current block of sixteen data values per color component generated by the selected coding mode. In the present description, the data values of the current block for each color component are also referred to as samples and the entropy coder can be described as receiving a block of sixteen samples for each color component. For each block of data values associated with a respective color component, the entropy coder 40 performs grouping of one or more samples into an entropy coding group (ECG) (42). In particular, the samples in the current block for each component are distributed among a predetermined number of entropy coding groups. For example, for 4:4:4 video content, a block of 16 samples for a component may be distributed into four entropy coding groups. The entropy coder 40 then converts the sample values in each group to a predetermined bit-based representation (44). For example, the entropy coder 40 may convert the data values to the two's complement representation. Alternately, the entropy coder 40 may convert the data values to sign-magnitude representation. The entropy coder 40 then determines the prefix value for each group of the block (46). With the prefix and the suffixes thus formed for each group, the entropy coder 40 packages the entropy coding groups into a compressed bitstream to be transmitted (48). In this manner, the encoded data for each color component of the video content will be transmitted in the compressed bitstream as a set of entropy coding groups.

The data values being coded by the entropy coder are a function of the coding mode selected. In one example, when the transform coding mode is selected, the entropy coder encodes the quantized transform coefficients. That is, the data values are the quantized transform coefficients. In another example, when the block prediction mode is selected, the entropy coder encodes the quantized prediction residuals.

In the above description, the video content is assumed to be a 4:4:4 video content. In that case, there are 16 samples per block for each color component (e.g. RGB). In other examples, the video content may be a 4:2:2 video content. For the 4:2:2 video content, the luma component contains a block of 16 samples and the two chroma components contain only 8 samples or 4×2 block size. In yet another example, the video content may be a 4:2:0 video content. For the 4:2:0 video content, the luma component contains a block of 16 samples and the two chroma components contain only 4 samples or 2×2 block size.

The entropy coder receives 16 samples for each color component in a current block of data values and divides the samples into entropy coding groups. The sample values in each entropy coding group are then encoded into bit-based representation. In the present description, the entropy coding groups are converted to bit-based representation using common prefix entropy code (CPEC). FIG. 6, which includes FIGS. 6(a) to 6(d), illustrates entropy coding group structure and the output of the common prefix entropy code (CPEC) in some examples. Referring to FIG. 6(a), the entropy coder divided the samples into entropy coding groups where each entropy coding group consists of a variable-length prefix and one or more fixed-length suffixes. In the example shown in FIG. 6(a), the entropy coding group includes four suffixes associated with four samples.

For each entropy coding group, CPEC is applied to convert the sample values into bit-based representation. In particular, an entropy coding group with a group size of N or N samples includes a variable-length prefix followed by N fixed-length suffixes. Using CPEC, the prefix is coded using a variable length code, e.g., unary code, and represents the number of bits used to code each suffix. The actual sample value within the group is represented in the suffix, one suffix for each sample within the group. All N suffixes within the group are allocated the same number of bits, i.e., fixed length code. For example, the samples can be represented in two's complement or sign-magnitude representation. In particular, each suffix in an entropy coding group using CPEC corresponds to one sample value encoded in the given bit-based representation.

FIG. 6(b) illustrates an example CPEC structure for an entropy coding group with 4 samples having sample values {1, −2, −1, 0}. In this example, two's complement representation is used to generate the bits for the entropy coding group. The number of bits required for a faithful reconstruction of this group is 2. In particular, in two's complement representation, n bits are required to represent data in the range $[-2^{(n-1)}, 2^{(n-1)}-1]$. In the example of FIG. 6(b), the prefix will signal the value of 2. For the group of sample values {1, −2, −1, 0}, the bits outputted by the CPEC operation would be a prefix of 110 (unary code of 2) and four suffixes where each sample is coded using 2 bits, such as "01 10 11 00", as shown in FIG. 6(b). The output of the CPEC operation in the example of FIG. 6(b) is illustrative only and the actual output of the CPEC operation might be different depending on the actual implementation.

As thus constructed, the entropy encoder divides the samples of each components of a block to generate a set of entropy coding groups which are then transmitted in the compressed bitstream. At the entropy decoder, the variable length prefix of the current group is parsed and the remaining number of suffix bits in the current group is known. Therefore, the entropy decoder can jump and start parsing the prefix of the next group, while the decoder decodes the suffixes of the previous group, as shown in FIG. 6(c). Due to the limited number of variable length codes (at most 4 for one color component in a block of size 8×2), the decoder can achieve high throughput.

The example shown in FIG. 6(b) uses the two's complement representation. Other representation such as sign-magnitude can be also used in the CPEC operation to generate the bits for each entropy coding group. When sign-magnitude representation is used, n bits are required for each sample, where the absolute value (i.e., magnitude) of all the samples in the group are in the data range of $[0, 2^n-1]$. In the sign-magnitude representation, the sign bit is signaled only for the non-zero values. For the input group of sample value {1, −2, −1, 0}, the output of CPEC operation in sign-magnitude representation would be a prefix of 110 (unary code of 2), followed by suffixes that codes the absolute value of each sample using 2 bits, such as 01 10 01 00, and at last the sign bits 1 0 0, assuming 1 for positive symbol and 0 for negative symbol. Note that the sign value of last symbol 0 is not signaled. The output of CPEC operation using the sign-magnitude representation is shown in FIG. 6(d).

When all the samples in a group have zero values, only one bit is signaled for the entire group, which is referred as group skip in the present disclosure. Group skip is applicable for CPEC that uses sign-magnitude and two's complement representation.

The entropy coder determines the grouping of samples into entropy coding groups for each component in a block of samples. The size of each ECG, that is, the number of samples to be included in each ECG, will depend on the coding mode, the color component and the chroma sampling format. The distribution of samples within the entropy coding groups is also dependent on the coding mode.

FIG. 7, which includes FIGS. 7(a) and 7(b), illustrates the conventional grouping method used to form entropy coding groups for one component in a block of sample values coded by the transform mode. Referring to FIG. 7(a), in the case of the transform coding mode, each block of sample values for one component contains 8×2 or 16 quantized transform coefficients S0 to S15. The entropy coder distributes the 16 samples into four entropy coding groups ECG0 to ECG3, where each group is coded using the CPEC structure, as shown in FIG. 7(b). In particular, for the transform mode, a non-uniform grouping method is used where the size or number of samples for each entropy coding group is not the same. The non-uniform sample distribution is used for the transform mode so that samples with similar frequency in the transform domain are grouped together. Referring to FIG. 7(b), the conventional grouping method for samples in transform mode forms entropy coding groups of size 1, 3, 5 and 7. The DC value S0 is considered as a separate group ECG0. The group ECG1 contains three samples S1, S2 and S8. The group ECG2 contains five samples S3, S4, S9, S10 and S11. The group ECG3 contains seven samples S5, S6, S7, S12, S13, S14 and S15. In particular, the samples assigned to each group may be selected in a zig-zag pattern within the 8×2 block.

In the case of 4:4:4 video content, each color component (e.g. RGB) contains the same number of samples—that is, 16 samples per block. Therefore, the grouping method in FIG. 7 may be used for all of the color components. In the case of 4:2:2 video content, the luma component contains the block of 16 samples and so the grouping method in FIG. 7 may be used. However, the chroma components contain only 8 samples or 4×2 block size. In that case, a different grouping method is applied. FIG. 8, which includes FIGS. 8(a) and 8(b), illustrates the conventional grouping method used to form entropy coding groups for one component in a block of 8 sample values coded by the transform mode. Referring to FIG. 8(a), for 4:2:2 video content, the chroma components are represented by a block size of 4×2 or 8 samples. In that case, the conventional grouping method may form two entropy coding groups ECG0 and ECG1 with 1 and 7 samples respectively, as shown in FIG. 8(b).

For completeness of description, in the case of the block prediction mode, a uniform grouping method is used where each entropy coding group contains the same number of quantized residual samples. For example, the grouping method may put 4 samples per group for a 8×2 block of sample values per component. In one example, the first group ECG0 may contain the following samples: ECG 0: {S0, S1, S8, S9}. The second group ECG1 may contain the following samples: ECG 1: {S2, S3, S10, S11}, and so on.

Returning to FIG. 7, the conventional entropy coder applies the same grouping method for samples generated in transform mode and coded using CPEC. The conventional grouping method would be efficient when all the samples in a group are in the similar range, as all the suffix lengths are of the same size. However, the conventional grouping method becomes inefficient when the sample values in a group are spread out over a large range. For example, a large number of bits will be required when one sample value in a group is much bigger than the rest of the sample values.

The examples below illustrate two groups of sample values to be coded using the CPEC structure. In the first example, the sample values in the group are in the same range. In the second example, one sample value is in a different range from the others.

| Scenario 1 | Scenario 2 |
| --- | --- |
| sample values: {1, −2, −1, 0} | sample values: {1, −15, −1, 0} |
| Bits required per suffix: 2 | Bits required per suffix: 5 |
| Prefix length: 3 | Prefix lengths: 6 |
| Suffix length: 4 × 2 = 8 | Suffix length: 4 × 5 = 20 |
| Total length: 11 | Total length: 26 |

As illustrated in the above examples, when the sample values are in the same range (Scenario 1), a group length of 11 bits can be used to represent the group. However, when the sample values are not in the same range (Scenario 2), a group length of 26 is required to represent the group. The longer group length introduces inefficiency at the entropy coder.

In the conventional entropy coder, the same grouping method is used in the transform mode to form the entropy coding groups irrespective of the position of the blocks in the slice or the frame and further irrespective of the intra prediction mode being used for the transform mode. Using the same grouping methodology to construct the entropy coding groups is not an efficient approach for blocks that are in first line of the slice (FLS) or not in FLS (NFLS).

In the present description, video content are represented by video frames where a frame is one of the many still images which compose the complete moving picture. Furthermore, in the present description, a slice refers to a spatially distinct region of a frame that may be encoded separately from other regions in the same frame. In the present description, a pixel or a block of pixels are sometimes referred to as being in the "first line of the slice." As used herein, the reference "first line of the slice" may refer to a block that is in the first line of a slice within a video frame or a block that is in the first line of a video frame.

In a video frame, blocks that are in the first line of a frame or first line of a slice (FLS) do not have a previous line of video data. That is, for blocks in the first line of a slice, neighboring pixel values are unavailable or limited. In that case, for the intra prediction operation in the transform mode, the DC intra predictor is the only choice. DC value used for intra predictor is usually half of the dynamic range (e.g., for 8 bit images, the DC value is 128). The DC predicted value does not truly reflect the actual DC value of the current block. Using the DC intra predictor results in a higher DC coefficient value. Therefore, it is better to consider DC as a separate group in the grouping process.

On the other hand, for blocks that are not in the first line of a frame or a slice (NFLS), neighboring pixel values are available. Therefore, it is likely that the actual DC value of the block is correctly estimated from the neighbors. In this case, it is expected that the DC coefficient is zero or close to zero. In this case, it is not efficient to consider the DC coefficient in a separate group. It is actually more efficient to group the DC coefficient together with some AC coefficients.

In embodiments of the present disclosure, a display interface codec performs video signal compression using a transform coding mode and implementing entropy coding by applying multiple grouping methods to form the entropy coding groups. More specifically, a display stream encoder incorporates an entropy encoder that implements in the entropy coder multiple grouping methods for the transform mode. A particular grouping method is selected for a block based on one or more factors. The display interface codec improves the compression performance without increasing the complexity of the codec, while maintaining the same throughput at the decoder.

As described above, existing technology uses a fixed grouping scheme for the transform mode to form the entropy coding groups for all blocks. That is, the entropy coding groups for all blocks are formed using the same grouping method. To the contrary, the display stream encoder of the present disclosure provides multiple grouping methods for the transform mode and a particular grouping method is selected for a block based on one or more factors.

In some embodiments, a grouping method is selected for each block based on one or more of the following factors:

(1) The position of the block within the slice or the video frame;

(2) The intra prediction mode chosen during the transform mode processing; or (3) The color component of the input video source.

In one embodiment, the display stream encoder implements M grouping methods to group the samples of a component in a block into entropy coding groups for the transform mode. FIG. 9, which includes FIGS. 9(a) to 9(d), illustrates three grouping methods which can be applied to form entropy coding groups for the transform mode in some embodiments. Referring to FIG. 9, from the transform mode processing, a block of 16 quantized transform coefficients is generated for each component which are represented as sample values S0 to S15, as shown in FIG. 9(a). The display stream encoder implements various grouping methods to distribute the 16 samples into four entropy coding groups. Each grouping method may differ in the size of the each entropy coding group but all of the grouping methods generate the same total number of entropy coding groups, that is, four entropy coding groups.

In the present example, the display stream encoder implements a first grouping method forming a first entropy coding group ECG0 with DC coefficient only (S0), as shown in FIG. 9(b). That is, the first entropy coding group ECG0 has a size of 1 and includes sample S0 only. The other entropy coding groups ECG1, ECG2 and ECG3 have respective size of 3, 5, 7. The samples assigned to the groups ECG1, ECG2 and ECG3 may be selected in a zig-zag pattern within the 8×2 block, as shown in FIG. 9(b).

The display stream encoder implements a second grouping method forming a first entropy coding group ECG0 with DC coefficients and multiple AC coefficients, as shown in FIG. 9(c). In the present example, the first entropy coding group ECG0 has a size of 3 and includes samples S0, S1 and S2. The other entropy coding groups ECG1, ECG2 and ECG3 have respective size of 3, 4, 6. The samples assigned to the groups ECG1, ECG2 and ECG3 may be selected in a zig-zag pattern within the 8×2 block, as shown in FIG. 9(c).

Finally, in some embodiments, the display stream encoder may implement a third grouping method forming a first entropy coding group ECG0 with DC and one AC coefficient, as shown in FIG. 9(d). In the present example, the first entropy coding group ECG0 has a size of 2 and includes samples S0 and S1. The other entropy coding groups ECG1, ECG2 and ECG3 have respective size of 4, 4, 6. The samples assigned to the groups ECG1, ECG2 and ECG3 may be selected in a zig-zag pattern within the 8×2 block, as shown in FIG. 9(d).

The entropy coder in the display stream encoder applies one or more factors to select the grouping method to use for each block so that the sample values within an ECG group thus formed will have sample values within a similar range. The three grouping methods shown in FIG. 9 are illustrative only and not intended to be limiting. In other embodiments, two or more grouping methods can be implemented and each entropy coding group may have the same or different number of samples and the distribution of samples into the groups may be varied. All the grouping methods generate the same number of groups, e.g., four, but the distribution of samples among the four groups may vary.

FIG. 9 above illustrates the grouping methods for 4:4:4 video content where all the three components in a block includes 16 samples. For 4:2:2 video content, the chroma components contain only 8 samples and luminance component contain 16 samples. FIG. 10, which includes FIGS. 10(a) to 10(c), illustrates two grouping methods which can be applied to form entropy coding groups for the chroma components of the transform mode for 4:2:2 video content in some embodiments. Referring to FIG. 10, from the transform mode processing, a block of 8 quantized transform coefficients is provided as sample values S0 to S7 for the chroma components, as shown in FIG. 10(a). The display stream encoder implements a first grouping method forming a first entropy coding group ECG0 with DC coefficient only, as shown in FIG. 10(b). In the present example, the first entropy coding group ECG0 has a size of 1 and includes sample S0 only. The other entropy coding group ECG1 has a size of 7.

The display stream encoder implements a second grouping method forming a first entropy coding group ECG0 with DC coefficients and multiple AC coefficients, as shown in FIG. 10(c). In the present example, the first entropy coding group ECG0 has a size of 3 and includes samples S0, S1 and S2. The other entropy coding groups ECG1 has a size of 5. The entropy coder in the display stream encoder applies one or more factors to select the grouping method to use for each block so that the sample values within an ECG group thus formed will have sample values within a similar range.

Figure 11:
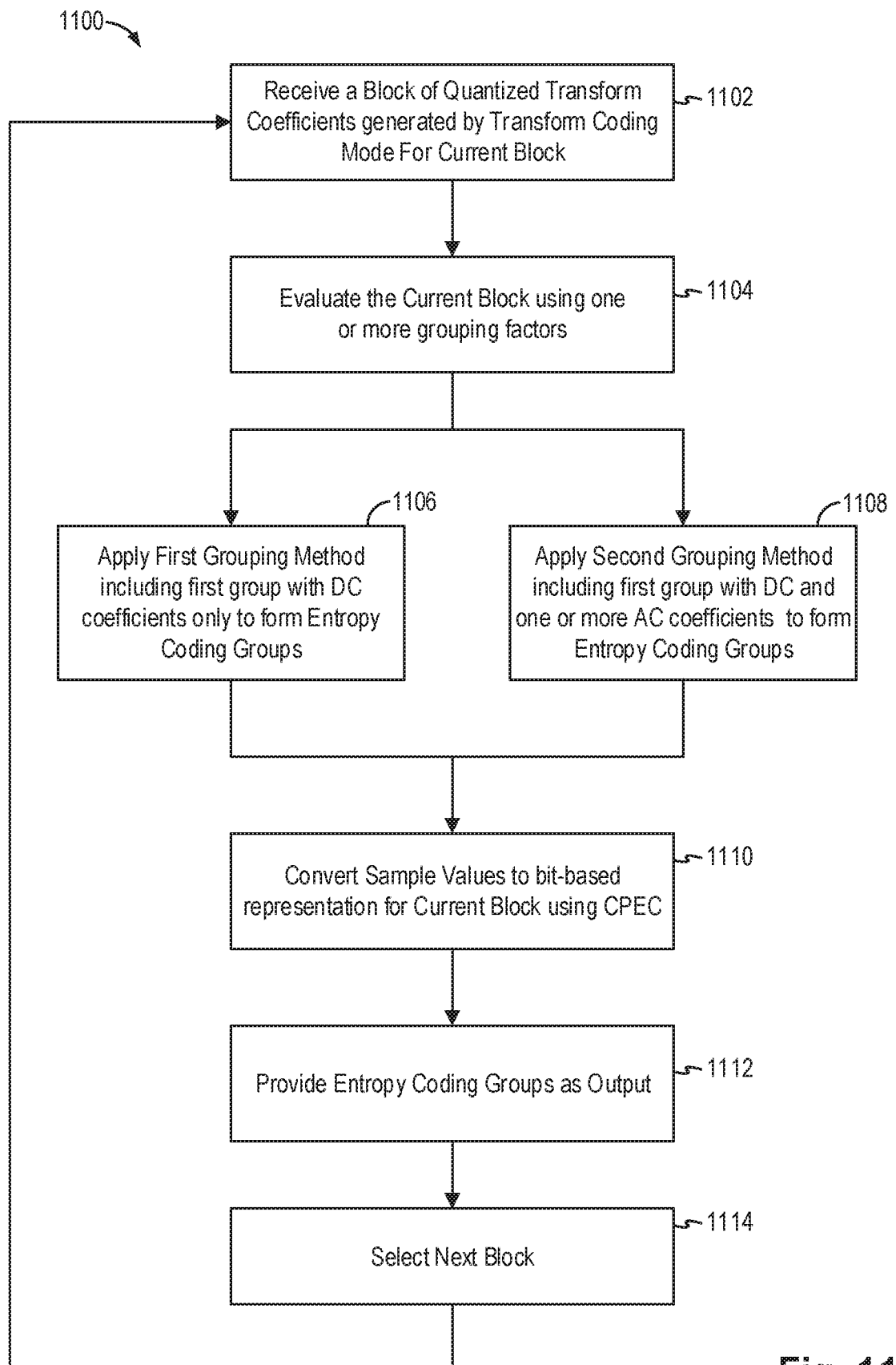
FIG. 11 is a flowchart illustrating an entropy coding grouping method implemented in an entropy encoder for transform mode in some embodiments.

FIG. 11 is a flowchart illustrating an entropy coding grouping method implemented in an entropy encoder for transform mode in some embodiments. The entropy coding grouping method can be implemented in the entropy coder 30 in the display stream encoder of FIG. 2 in some embodiments. In the transform coding mode, a block of quantized transform coefficients is generated for each component of a block of pixel values. Referring to FIG. 11, the entropy coding grouping method 1100 receives a block of S number of quantized transform coefficients generated by the transform coding mode processing for each component of the current block of pixel values (1102). The method 1100 evaluates the samples using one or more grouping factors (1104). For example, the method 1100 may determine the position of the current block within the slice or the video frame. Alternately, the method 1100 may determine the intra prediction mode chosen during the transform mode processing. Finally, the method 1100 may determine the color component of the samples being processed.

Based on the evaluation of the grouping factors, the method 1100 may apply a first grouping method including a first entropy coding group with DC coefficient only to form the entropy coding groups (1106). That is, the first entropy coding group has a size of 1 and includes only the first sample value of the block associated with the DC coefficient. In one example, the first grouping method is the grouping method shown in FIG. 9(b).

Alternately, based on the evaluation of the grouping factors, the method 1100 may apply a second grouping method including a first entropy coding group with DC coefficient and one or more AC coefficients to form the entropy coding groups (1108). That is, the first entropy coding group has a size greater than 1 and includes the first sample value of the block associated with the DC coefficient and one or more of the other sample values associated with AC coefficients. In one example, the second grouping method is the grouping method shown in FIG. 9(c).

Using the selected grouping method, the method 1100 distributes the S number of samples in the block into G number of entropy coding groups. Both the grouping methods generate the same number G of entropy coding groups. The grouping methods differ in the distribution of samples into each of the G entropy coding groups.

With the entropy coding groups thus formed, the method 1100 converts the samples values in each entropy coding group into bit-based representation for the current component of the current block using CPEC (1110). Using CPEC, the sample values in each entropy coding group are represented using a selected bit-based representation, such as sign-magnitude representation or two's complement representation.

With the set of G entropy coding groups thus formed, the method 1100 provides the set of entropy coding groups as output (1112) and the method 1100 selects the next block of sample values (1114). The method repeats at 1102 where the method 1100 receives the next block of quantized transform coefficients associated with a component of a new block of pixel values. It is instructive to note that all color components of a block will use the same grouping method. That is, the same grouping method will apply to the samples values in a block for all color components of the block.

In one example, the method receives a block of 16 samples to be divided into four groups. The first grouping method includes a first entropy coding group with a size of 1. That is, the first entropy coding group has one sample of the DC coefficient only. The second grouping method includes a first entropy coding group with a size greater than 1. That is, the first entropy coding group has two or more samples of the DC coefficient and at least one AC coefficient.

Figure 12:
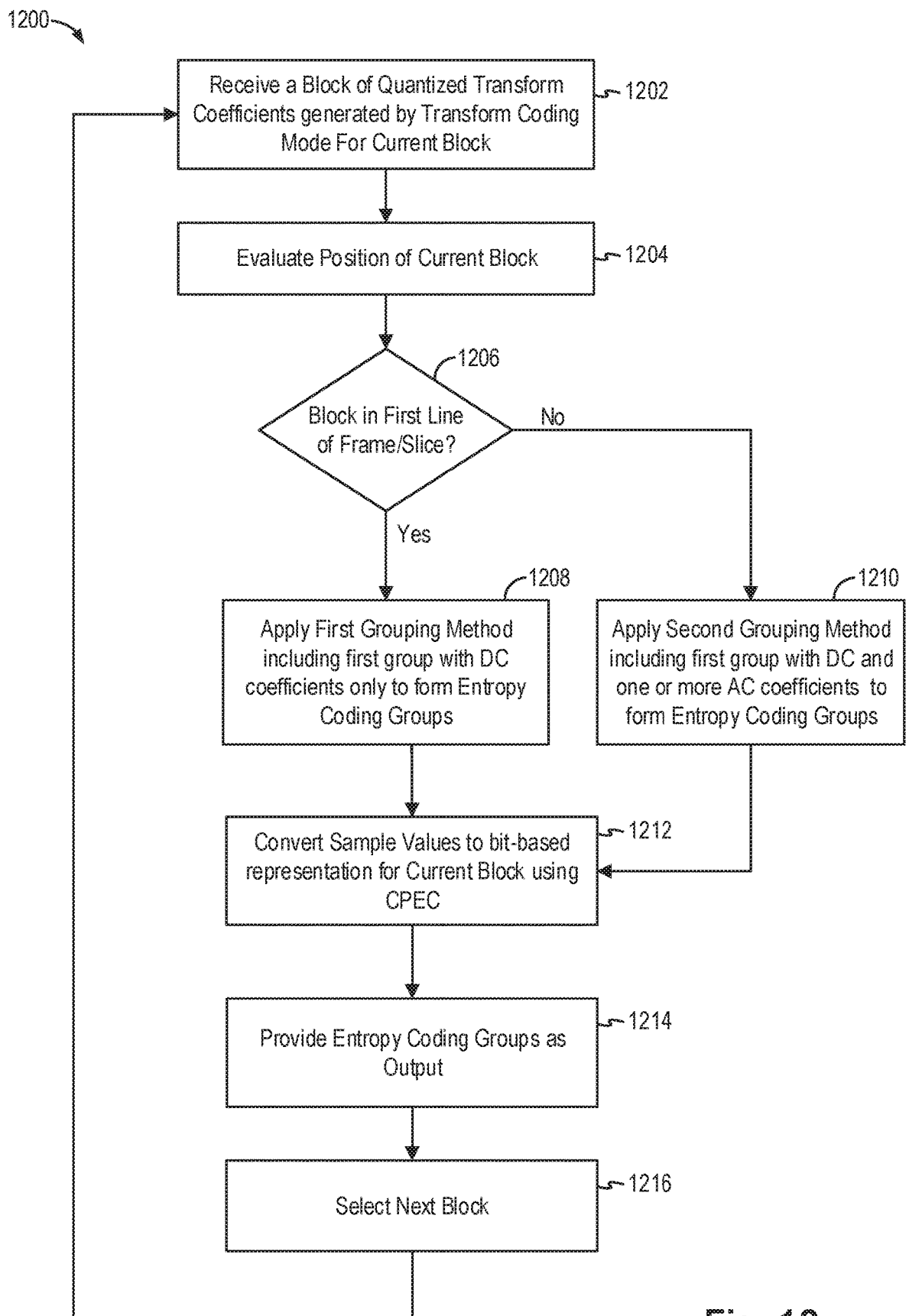
FIG. 12 is a flowchart illustrating an entropy coding grouping method implemented in an entropy encoder for transform mode in alternate embodiments.

In some embodiments, the entropy coding grouping method uses the position of the current block within the video frame or the video slice to determine the grouping method to use. FIG. 12 is a flowchart illustrating an entropy coding grouping method implemented in an entropy encoder for transform mode in alternate embodiments. The entropy coding grouping method can be implemented in the entropy coder 30 in the display stream encoder of FIG. 2 in some embodiments. In the transform coding mode, a block of quantized transform coefficients is generated for each component of each block of pixels. Referring to FIG. 12, the entropy coding grouping method 1200 receives a block of S number of quantized transform coefficients generated by the transform coding mode processing for a component of the current block of pixel values (1202). The method 1200 then evaluates the position of the current block within the video frame or a video slice (1204). In particular, the method 1200 determines if the current block is in the first line of the frame or first line of the slice (1206).

In response to determining that the current block is in the first line of the frame or slice, the method 1200 applies a first grouping method including a first entropy coding group with DC coefficient only to form the entropy coding groups (1208). That is, the first entropy coding group has a size of 1 and includes only the first sample value of the block associated with the DC coefficient. In one example, the first grouping method is the grouping method shown in FIG. 9(*b*).

In response to determining that the current block is not in the first line of the frame or slice, the method 1200 applies a second grouping method including a first entropy coding group with DC coefficient and one or more AC coefficients to form the entropy coding groups (1210). That is, the first entropy coding group has a size greater than 1 and includes the first sample value of the block associated with the DC coefficient and one or more of the other sample values associated with AC coefficients. In one example, the second grouping method is the grouping method shown in FIG. 9(*c*).

Using the selected grouping method, the method 1200 distributes the S number of samples in the block into G number of entropy coding groups. Both the grouping methods generate the same number G of entropy coding groups. The grouping methods differ in the distribution of samples into each of the G entropy coding groups.

With the entropy coding groups thus formed, the method 1200 converts the samples values in each entropy coding group into bit-based representation for the current component of the current block using CPEC (1212). Using CPEC, the sample values in each entropy coding group are represented using a selected bit-based representation, such as sign-magnitude representation or two's complement representation.

With the set of G entropy coding groups thus formed, the method 1200 provides the set of entropy coding groups as output (1214) and the method 1200 selects the next block (1216). The method repeats at 1202 where the method 1200 receives the next block of quantized transform coefficients associated with a component of a new block of pixel values. It is instructive to note that all color components of a block will use the same grouping method. That is, the same grouping method will apply to the samples values in a block for all color components of the block.

In one example, the method receives a block of 16 samples to be divided into four groups. The first grouping method includes a first entropy coding group with a size of 1. That is, the first entropy coding group has one sample of the DC coefficient only. The second grouping method includes a first entropy coding group with a size greater than 1. That is, the first entropy coding group has two or more samples of the DC coefficient and at least one AC coefficient.

As thus constructed, the entropy coding grouping method 1200 uses the first grouping method for the first line of the video frame or slice and use the second grouping method for all other lines of the video frame and slice. The entropy coding grouping method 1200 realizes efficiency improvement over the conventional grouping method where the same grouping method is applied for all blocks of pixels regardless of the block's position within the frame or slice. In particular, for blocks that are not in the first line of the frame or slice, the actual DC value of the block can be correctly estimated from the neighbor's samples. Therefore, it is likely that the DC coefficient is in the same range as the other AC transform coefficients. Therefore, it is not necessary to separate the DC coefficient into a separate entropy coding group. Instead, the DC coefficient can be combined with one or more AC coefficients. After constructing the first entropy coding group ECG0, the remaining coefficients are partitioned into groups (may be uniformly or non-uniformly) such that the total number of groups between the first and second grouping methods are the same.

In some embodiments, the entropy coding grouping method applies the second grouping method (FIG. 9(*c*)) when two conditions are met—the current block is not in the first line of the frame or slice and the transform mode intra predictor is the DC predictor. Otherwise, the first grouping method (FIG. 9(*b*)) is used. That is, the first grouping method is used for blocks that are in the first line of the video frame or slice or when the transform mode intra predictor is not the DC predictor.

Figure 13:
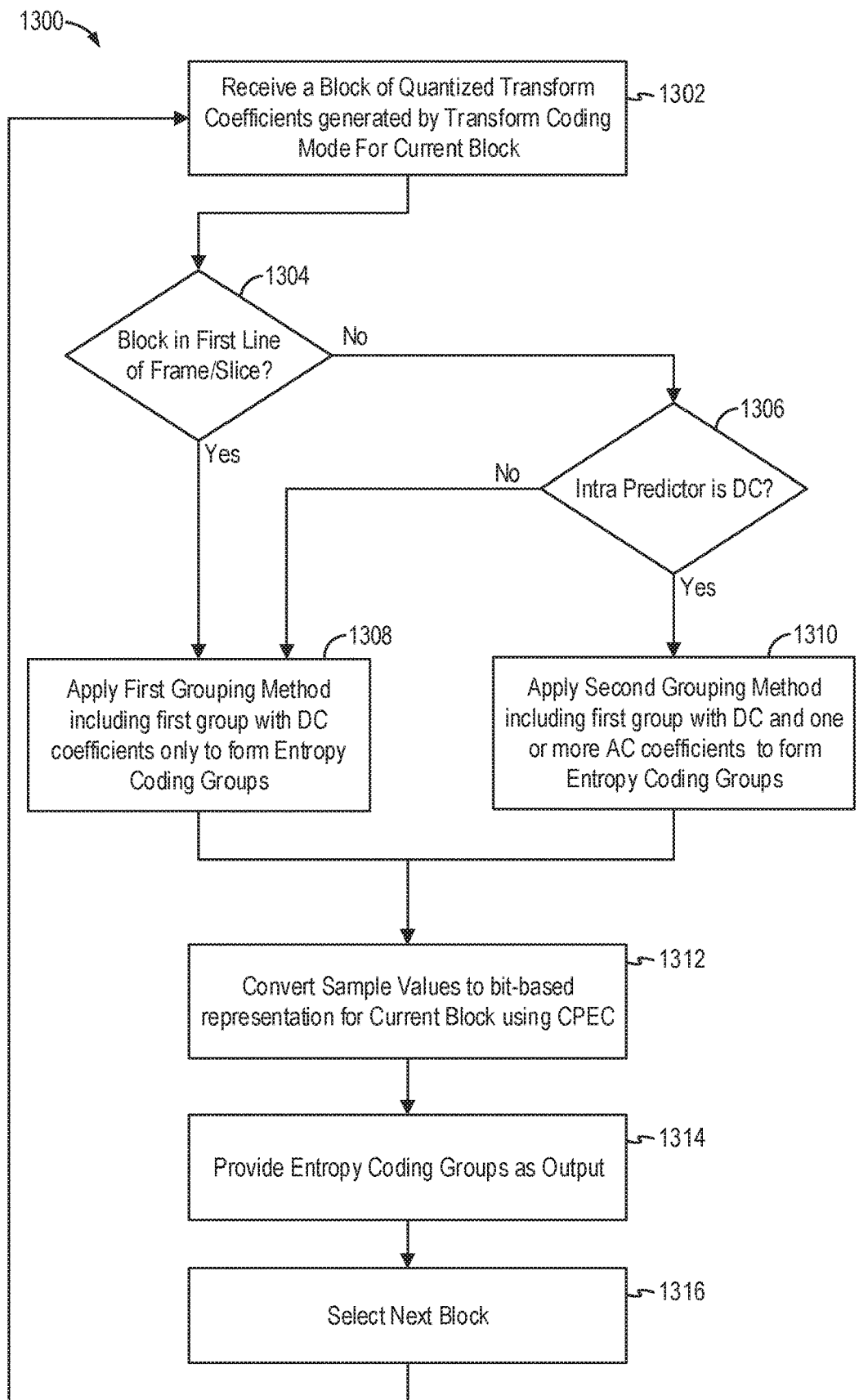
FIG. 13 is a flowchart illustrating an entropy coding grouping method implemented in an entropy encoder for transform mode in alternate embodiments.

FIG. 13 is a flowchart illustrating an entropy coding grouping method implemented in an entropy encoder for transform mode in alternate embodiments. The entropy coding grouping method can be implemented in the entropy coder 30 in the display stream encoder of FIG. 2 in some embodiments. In the transform coding mode, a block of quantized transform coefficients is generated for each component of each block of pixels. Referring to FIG. 13, the entropy coding grouping method 1300 receives a block of S number of quantized transform coefficients generated by the transform coding mode processing for the current component of the current block of pixel values (1302). The method 1300 then evaluates the position of the current block within the video frame or a video slice (1304). In particular, the method 1200 determines if the current block is in the first line of the frame or first line of the slice (1304).

In response to determining that the current block is in the first line of the frame or slice, the method 1300 applies a first grouping method including a first entropy coding group with DC coefficient only to form the entropy coding groups (1308). That is, the first entropy coding group has a size of 1 and includes only the first sample value of the block associated with the DC coefficient. In one example, the first grouping method is the grouping method shown in FIG. 9(*b*).

In response to determining that the current block is not in the first line of the frame or slice, the method 1300 continues to determine if the transform mode intra predictor used for the current block is the DC predictor (1306). In response to determining that the current block does not use the DC intra predictor in the transform mode, the method 1300 applies the first grouping method to form the entropy coding groups (1308).

In response to determining that the transform mode intra predictor used for the current block is the DC predictor, the method 1300 applies a second grouping method including a first entropy coding group with DC coefficient and one or more AC coefficients to form the entropy coding groups (1310). That is, the first entropy coding group has a size greater than 1 and includes the first sample value of the block associated with the DC coefficient and one or more of the other sample values associated with AC coefficients. In one example, the second grouping method is the grouping method shown in FIG. 9(*c*). In this manner, the second grouping method is applied only for blocks that are not in the first line of the frame or slice and that uses the DC intra predictor.

Using the selected grouping method, the method 1300 distributes the S number of samples in the block into G number of entropy coding groups. Both the grouping methods generate the same number G of entropy coding groups.

The grouping methods differ in the distribution of samples into each of the G entropy coding groups.

With the entropy coding groups thus formed, the method 1300 converts the samples values in each entropy coding group into bit-based representation for the current component of the current block using CPEC (1312). Using CPEC, the sample values in each entropy coding group are represented using a selected bit-based representation. In some embodiments, the sample values are represented using two's complement representation. In other embodiments, the sample values are represented using sign-magnitude representation.

With the set of G entropy coding groups thus formed, the method 1300 provides the set of entropy coding groups as output (1314) and the method 1300 selects the next block (1316). The method repeats at 1302 where the method 1300 receives the next block of quantized transform coefficients associated with a component of a new block of pixel values. It is instructive to note that all color components of a block will use the same grouping method. That is, the same grouping method will apply to the samples values in a block for all color components of the block.

In one example, the method receives a block of 16 samples to be divided into four groups. The first grouping method includes a first entropy coding group with a size of 1. That is, the first entropy coding group has one sample of the DC coefficient only. The second grouping method includes a first entropy coding group with a size greater than 1. That is, the first entropy coding group has two or more samples of the DC coefficient and at least one AC coefficient.

As thus constructed, the entropy coding grouping method 1300 uses the first grouping method for the first line of the video frame or slice or for other lines of the video frame or slice when the intra predictor used is not the DC predictor. The method uses the second grouping method for all other lines of the video frame and slice and when the intra predictor used is the DC predictor. The entropy coding grouping method 1300 realizes efficiency improvement over the conventional grouping method where the same grouping method is applied for all blocks of pixels regardless of the block's position within the frame or slice or regardless of the intra predictor being used. In particular, for a block for which the DC predictor is selected as the best intra predictor, it is expected that DC value is in the same range as the other coefficients. Therefore, in this case, it is more efficient to construct the first entropy coding group with DC and one or more AC coefficients.

Alternately, for all the blocks in the first line of the frame or slice, or for blocks not in the first line but where an intra predictor other than the DC predictor is used, the first ECG method is used where DC coefficient is separated in its own group.

The entropy coding grouping methods described above are illustrative only. Other grouping methods can be used to form the entropy coding groups in other embodiments of the present disclosure. In the above described embodiments, the entropy coding grouping methods are applied to a block size of 8×2 or 4×2 pixels. In other embodiments, the transform mode technique using multiple grouping methods can be applied to any block size.

Furthermore, in the above described embodiments, the CPEC operation in the transform mode is described as using the two's complement representation for the sample values. In other embodiments, the CPEC operation of the transform mode can use the two's complement representation or the sign-magnitude representation, or both, for the sample values.

Figure 14:
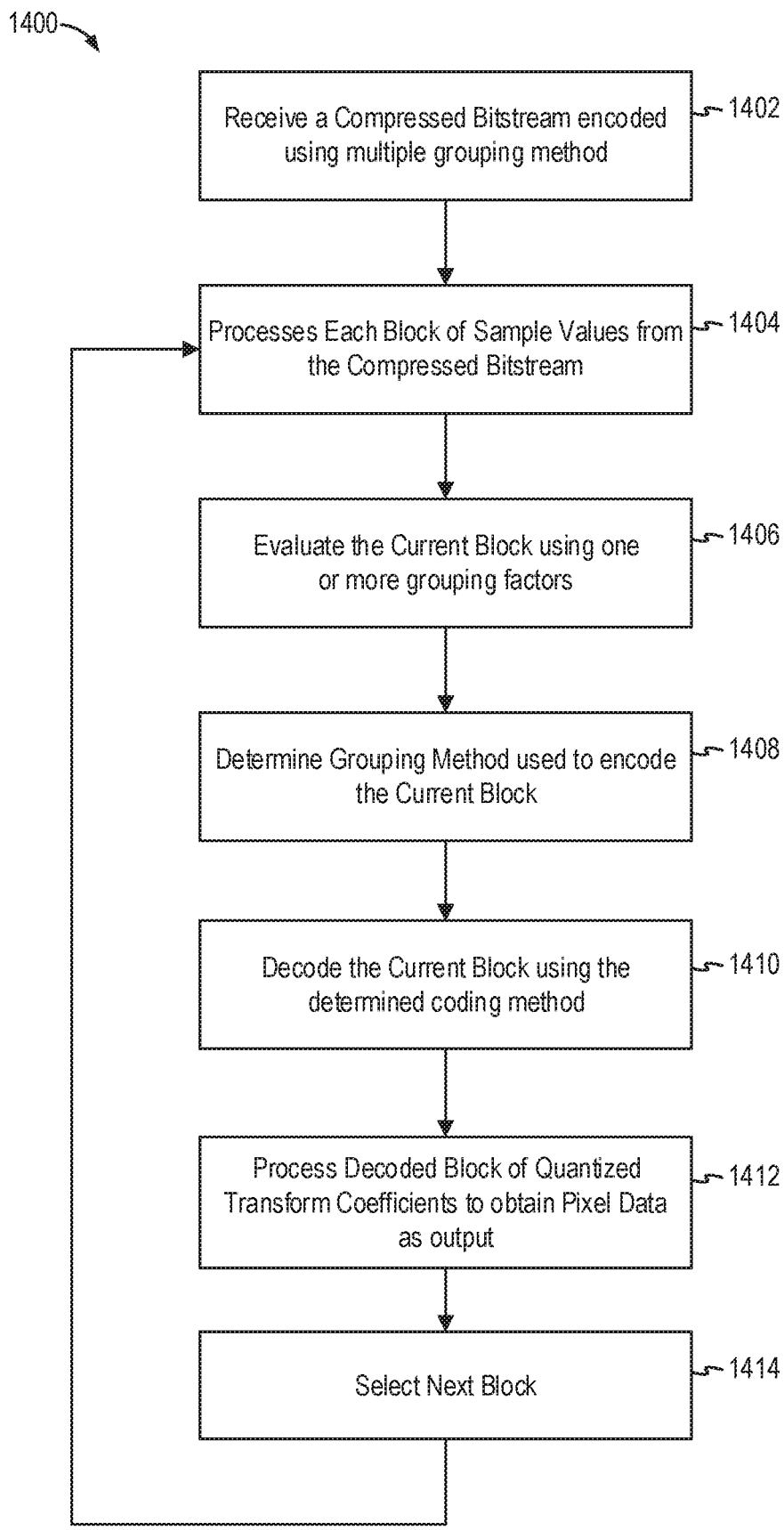
FIG. 14 is a flowchart illustrating a decoding method implemented in a display stream decoder in some embodiments.

Returning to FIG. 1, with the compressed bitstream thus formed by the display stream encoder 15, the compressed bitstream is transmitted over the display link 13 to the display driver integrated circuit 16. At the display driver integrated circuit 16, the display stream decoder 18 performs decoding of the compressed bitstream. In embodiments of the present disclosure, the display stream decoder is configured to implement the entropy coding group grouping methodology used by the encoder in order to decode the received compressed bitstream. FIG. 14 is a flowchart illustrating a decoding method implemented in a display stream decoder in some embodiments. Referring to FIG. 14, a decoding method 1400 receives a compressed bitstream (1402). The decoding method 1400 is configured to decode a compressed bitstream that has been encoded using the entropy coding grouping method described above where the transmitted data includes blocks that have been encoded using multiple grouping methods in transform mode.

The decoding method 1400 processes each block of sample values from the compressed bitstream (1404). For the current block of sample values being processed, the decoding method 1400 evaluates the current block using one or more grouping factors (1406). In particular, the decoding method 1400 uses the same set of grouping factors used to encode the block at the encoder. For example, the decoding method 1400 may determine the position of the current block within the slice or the video frame. Alternately, the decoding method 1400 may determine the intra prediction mode chosen during the transform mode processing. Finally, the decoding method 1400 may determine the color component of the input video source.

Based on the evaluation of the grouping factors, the decoding method 1400 determines the specific grouping method used to encode the block (1408). For example, the decoding method 1400 determines whether the block has been encoded using the first grouping method or the second grouping method described above. For instance, the first grouping method includes a first entropy coding group with DC coefficient only and the second grouping method includes a first entropy coding group with DC coefficient and one or more AC coefficients.

With the grouping method determined, the decoding method 1400 proceeds to decode the current block using the determined grouping method (1410). In particular, the decoding method 1400 parses bits associated with the quantized transform coefficients of a component in a block and decodes the sample values for each group. Then, the sample values for each group are used to construct the 8×2 block-wise quantized transform coefficients for each component by applying inverse of the grouping operations carried at the encoder side. For example, the inverse of the grouping operations of FIGS. 9(*a*) and 9(*c*) is carried out to put the sample values of the entropy coding groups back into the 8×2 block-wise order. As a result, a block of 8×2 quantized transform coefficients for a component of the current block is obtained.

The decoding method 1400 then processes the 8×2 quantized transform coefficients to obtain the pixel values for the current block (1412). For example, the decoding method 1400 applies the inverse of the operation in FIG. 3 to obtain the block of pixel values from the block of quantized transform coefficients. The decoding method 1400 provide the pixel data as the video data output where the pixel data can be provided to the display for video playback, for example. The decoding method 1400 then selects the next block (1414) and the method repeats at 1404 where the selected block is processed.

In one example, the decoding method evaluates the current block using the position of the block within the frame or slice. For blocks that are in the first line of the frame or slice, the decoding method determines that the first grouping method has been used to encode the block and the decoding method uses the grouping scheme of the first grouping method to decode the current block. For blocks that are not in the first line of the frame or slice, the decoding method determines that the second grouping method has been used to encode the block and the decoding method uses the grouping scheme of the second grouping method to decode the current block.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided above along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The above detailed descriptions are provided to illustrate specific embodiments of the present disclosure and are not intended to be limiting. Numerous modifications and variations within the scope of the present disclosure are possible. The present disclosure is defined by the appended claims.

What is claimed is:

1. A method of forming entropy coding groups in an entropy encoder operating in a transform mode, the method comprising:
   receiving a block of a first number of quantized transform coefficients generated by the transform mode processing as a current block of sample values;
   evaluating the current block of sample values using one or more grouping factors;
   in response to a determination that the current block meets a first grouping condition based on at least one grouping factor, selecting a first grouping method for the current block, the first grouping method forming a second number of entropy coding groups where a first entropy coding group includes one sample value comprising a DC transform coefficient;
   in response to a determination that the current block meets a second grouping condition based on at least one grouping factor, selecting a second grouping method for the current block, the second grouping method forming the second number of entropy coding groups where a first entropy coding group includes at least two sample values, one of the sample values comprising the DC transform coefficient;
   forming the second number of entropy coding groups using the selected grouping method;
   converting the sample values in each entropy coding group to a bit-based representation; and
   providing the bit-representation of the second number of entropy coding groups as an output.

2. The method of claim 1, wherein converting the sample values in each entropy coding group to a bit-based representation comprises:
   converting the sample values in each entropy coding group to a two's complement bit-based representation using common prefix entropy code (CPEC).

3. The method of claim 1, wherein converting the sample values in each entropy coding group to a bit-based representation comprises:
   converting the sample values in each entropy coding group to a sign-magnitude bit-based representation using common prefix entropy code (CPEC).

4. The method of claim 1, wherein evaluating the current block of sample values using one or more grouping factors comprises:
   evaluating the current block of sample values to determine the position of the current block within a video frame or a video slice.

5. The method of claim 4, wherein in response to a determination that the current block meets a first grouping condition based on at least one grouping factor, selecting a first grouping method for the current block comprises:
   in response to a determination that the current block is positioned in a first line of the video frame or the video slice, selecting the first grouping method for the current block.

6. The method of claim 5, wherein in response to a determination that the current block meets a second grouping condition based on at least one grouping factor, selecting a second grouping method for the current block comprises:
   in response to a determination that the current block is positioned other than in the first line of the video frame or the video slice, selecting the second grouping method for the current block.

7. The method of claim 1, wherein the first number of quantized transform coefficients comprises sixteen quantized transform coefficients for a giving video content format and the second number of entropy coding groups comprises four entropy coding groups.

8. The method of claim 1, wherein the second grouping method forms the second number of entropy coding groups where the first entropy coding group includes at least two sample values, one of the sample values comprising the DC transform coefficient and at least one other sample value comprising an AC transform coefficient.

9. The method of claim 1, wherein evaluating the current block of sample values using one or more grouping factors comprises:
   evaluating the current block of sample values to determine the position of the current block within a video frame or a video slice and to determine an intra predictor used in the transform mode processing.

10. The method of claim 9, wherein in response to a determination that the current block meets a first grouping condition based on at least one grouping factor, selecting a first grouping method for the current block comprises:
in response to a determination that the current block is positioned in a first line of the video frame or the video slice or that the current block uses an intra predictor other than a DC predictor in the transform mode processing, selecting the first grouping method for the current block.

11. The method of claim 10, wherein in response to a determination that the current block meets a second grouping condition based on at least one grouping factor, selecting a second grouping method for the current block comprises:
in response to a determination that the current block is positioned other than in the first line of the video frame or the video slice and that the current block uses the DC predictor as the intra predictor the transform mode processing, selecting the second grouping method for the current block.

12. The method of claim 10, wherein the block of quantized transform coefficients is derived from a block of pixel values having a plurality of components, the block of quantized transform coefficients being associated with one component of the block of pixel values, the method further comprising:
forming the second number of entropy coding groups using the selected grouping method for each block of quantized transform coefficient associated with each of the other components.

13. A system for forming entropy coding groups in an entropy encoder operating in a transform mode, comprising:
a processor; and
a memory coupled with the processor, wherein the memory is configured to provide the processor with instructions which when executed cause the processor to:
receive a block of a first number of quantized transform coefficients generated by the transform mode processing as a current block of sample values;
evaluate the current block of sample values using one or more grouping factors;
in response to a determination that the current block meets a first grouping condition based on at least one grouping factor, select a first grouping method for the current block, the first grouping method forming a second number of entropy coding groups where a first entropy coding group includes one sample value comprising a DC transform coefficient;
in response to a determination that the current block meets a second grouping condition based on at least one grouping factor, select a second grouping method for the current block, the second grouping method forming the second number of entropy coding groups where a first entropy coding group includes at least two sample values, one of the sample values comprising the DC transform coefficient;
form the second number of entropy coding groups using the selected grouping method;
convert the sample values in each entropy coding group to a bit-based representation; and
provide the bit-representation of the second number of entropy coding groups as an output.

14. The system recited in claim 13, wherein the memory is further configured to provide the processor with instructions which when executed cause the processor to:
evaluate the current block of sample values to determine the position of the current block within a video frame or a video slice; and
in response to a determination that the current block is positioned in a first line of the video frame or the video slice, select the first grouping method for the current block.

15. The system recited in claim 14, wherein the memory is further configured to provide the processor with instructions which when executed cause the processor to:
in response to a determination that the current block is positioned other than in the first line of the video frame or the video slice, select the second grouping method for the current block.

16. The system recited in claim 13, wherein the memory is further configured to provide the processor with instructions which when executed cause the processor to:
evaluate the current block of sample values to determine the position of the current block within a video frame or a video slice and to determine an intra predictor used in the transform mode processing; and
in response to a determination that the current block is positioned in a first line of the video frame or the video slice or that the current block uses an intra predictor other than a DC predictor in the transform mode processing, select the first grouping method for the current block.

17. The system recited in claim 16, wherein the memory is further configured to provide the processor with instructions which when executed cause the processor to:
in response to a determination that the current block is positioned other than in the first line of the video frame or the video slice and that the current block uses the DC predictor as the intra predictor the transform mode processing, select the second grouping method for the current block.

18. The system recited in claim 13, wherein the memory is further configured to provide the processor with instructions which when executed cause the processor to:
converting the sample values in each entropy coding group to a two's complement or sign-magnitude bit-based representation using common prefix entropy code (CPEC).

19. The system recited in claim 13, wherein the second grouping method forms the second number of entropy coding groups where the first entropy coding group includes at least two sample values, one of the sample values comprising the DC transform coefficient and at least one other sample value comprising an AC transform coefficient.

20. A method of decoding a compress bit stream, the method comprising:
receiving a compressed bitstream that has been encoded using an encoding method in an entropy encoder utilizing a plurality of grouping methods in transform mode operation;
processing a current block of samples values in the received compressed bitstream;
evaluating the current block of sample values using one or more grouping factors;
determining a grouping method from the plurality of grouping methods used to encode the current block, the plurality of grouping methods including a first grouping method forming a second number of entropy coding groups where a first entropy coding group includes one sample value comprising a DC transform coefficient and a second grouping method forming the second number of entropy coding groups where a first entropy coding group includes at least two sample values, one of the sample values comprising the DC transform coefficient;

in response to the determining, decoding the current block using the determined grouping method; and generating quantized transform coefficients for each component of the current block as an output.

* * * * *